(12) United States Patent
Namai

(10) Patent No.: US 9,912,219 B1
(45) Date of Patent: Mar. 6, 2018

(54) OUTPUT VOLTAGE CONTROL CIRCUIT

(71) Applicant: KABUSHIKI KAISHA TOSHIBA, Tokyo (JP)

(72) Inventor: Atsushi Namai, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/441,078

(22) Filed: Feb. 23, 2017

(30) Foreign Application Priority Data

Sep. 6, 2016 (JP) .................................. 2016-173971

(51) Int. Cl.
*G05F 5/00* (2006.01)
*H02M 1/08* (2006.01)
*H02M 3/07* (2006.01)
*H02M 1/00* (2006.01)

(52) U.S. Cl.
CPC ................ *H02M 1/08* (2013.01); *H02M 3/07* (2013.01); *H02M 2001/0003* (2013.01)

(58) Field of Classification Search
CPC ....................................................... G05F 5/00
USPC ........................................ 323/299, 300, 303
See application file for complete search history.

(56) References Cited

U.S. PATENT DOCUMENTS

| 6,452,369 | B1* | 9/2002 | Lang | ..................... | H02J 7/0029 |
| | | | | | 323/285 |
| 7,741,818 | B2* | 6/2010 | Agari | ..................... | H02M 3/158 |
| | | | | | 307/86 |
| 7,911,191 | B2* | 3/2011 | Lewis | ....................... | G05F 1/46 |
| | | | | | 323/273 |
| 8,963,617 | B1 | 2/2015 | Sim et al. | | |
| 2014/0300337 | A1* | 10/2014 | Wright | ..................... | G06F 1/24 |
| | | | | | 323/299 |
| 2015/0188421 | A1* | 7/2015 | Ko | ........................ | H02M 3/156 |
| | | | | | 323/282 |

OTHER PUBLICATIONS

LTC4365 "Overvoltage, Undervoltage and Reverse Supply Protection Controller", Linear Technology Corporation 2013, pp. 1-20, LT 0913 REV A, printed in USA.

* cited by examiner

*Primary Examiner* — Gary Nash
(74) *Attorney, Agent, or Firm* — Patterson & Sheridan, LLP

(57) ABSTRACT

In an embodiment, an output voltage control circuit includes a detection circuit that is connected to an input voltage terminal and configured to detect a voltage level of an input voltage received at the input voltage terminal and output one or more detection signals corresponding to a comparison of the voltage level of the input voltage to a plurality of predetermined voltage ranges. A selection circuit is connected to the detection circuit and configured to select a first voltage from among a plurality of first voltages according the one or more detection signals from the detection circuit. An output circuit is connected to the selection circuit and configured to output a second voltage by boosting the input voltage based on the first voltage selected by the selection unit.

20 Claims, 11 Drawing Sheets

FIG. 8

| VIN | SIG_1 | SIG_2 | SIG_A | SIG_B | SIG_C |
|---|---|---|---|---|---|
| VIN<4V | L | L | H | L | L |
| 4V ≦VIN<10V | H | L | L | H | L |
| VIN≧10V | H | H | L | L | H |

FIG. 12

| VIN | SIG_1 | SIG_2 | SIG_3 | SIG_A | SIG_B | SIG_C | SIG_D |
|---|---|---|---|---|---|---|---|
| VIN<4V | L | L | L | H | L | L | L |
| 4V≦VIN<10V | H | L | L | L | H | L | L |
| 10V≦VIN<16V | H | H | L | L | L | H | L |
| VIN≧16V | H | H | H | L | L | L | H |

OUTPUT VOLTAGE CONTROL CIRCUIT

CROSS-REFERENCE TO RELATED APPLICATION

This application is based upon and claims the benefit of priority from Japanese Patent Application No. 2016-173971, filed Sep. 6, 2016, the entire contents of which are incorporated herein by reference.

FIELD

Embodiments described herein relate generally to an output voltage control circuit.

BACKGROUND

In related art, a gate drive circuit that supplies a voltage boosted by a voltage boosting circuit to a gate of an external MOS transistor is known as a gate drive circuit for driving the external MOS transistor.

However, no technique is available for controlling the boosted voltage to with a compact circuit configuration under actual conditions present in the related art. Therefore, the related art has a problem in that it is difficult to reduce chip/die size when agate drive circuit is mounted thereon and thus a size of a product including the chip embedded in a package is difficult to reduce in size.

DESCRIPTION OF THE DRAWINGS

FIG. 8 is a diagram illustrating a truth value table of the output voltage control circuit according to the embodiment.

FIG. 12 is a diagram illustrating a truth value table of the output voltage control circuit according to the modification example of the embodiment.

DETAILED DESCRIPTION

In general, according to one embodiment, an output voltage control circuit includes a detection circuit connected to an input voltage terminal and configured to detect a voltage level of an input voltage received at the input voltage terminal and output one or more detection signals corresponding to a comparison of the voltage level of the input voltage to a plurality of predetermined voltage ranges. A selection circuit is connected to the detection circuit and configured to select a first voltage from among a plurality of first voltages according the one or more detection signals from the detection circuit. An output circuit is connected to the selection circuit and configured to output a second voltage by boosting the input voltage based on the first voltage selected by the selection unit.

Hereinafter, description will be given of an example embodiment with reference to the drawings. In the following examples, characteristic configurations and operations of an output voltage control circuit will be primarily described. In the following description, some configurations and operations of the output voltage control circuit, which would be obvious to one of ordinary skill in the art, may be omitted. These omitted configurations and operations are also included in the scope of the disclosure.

Figure 1:
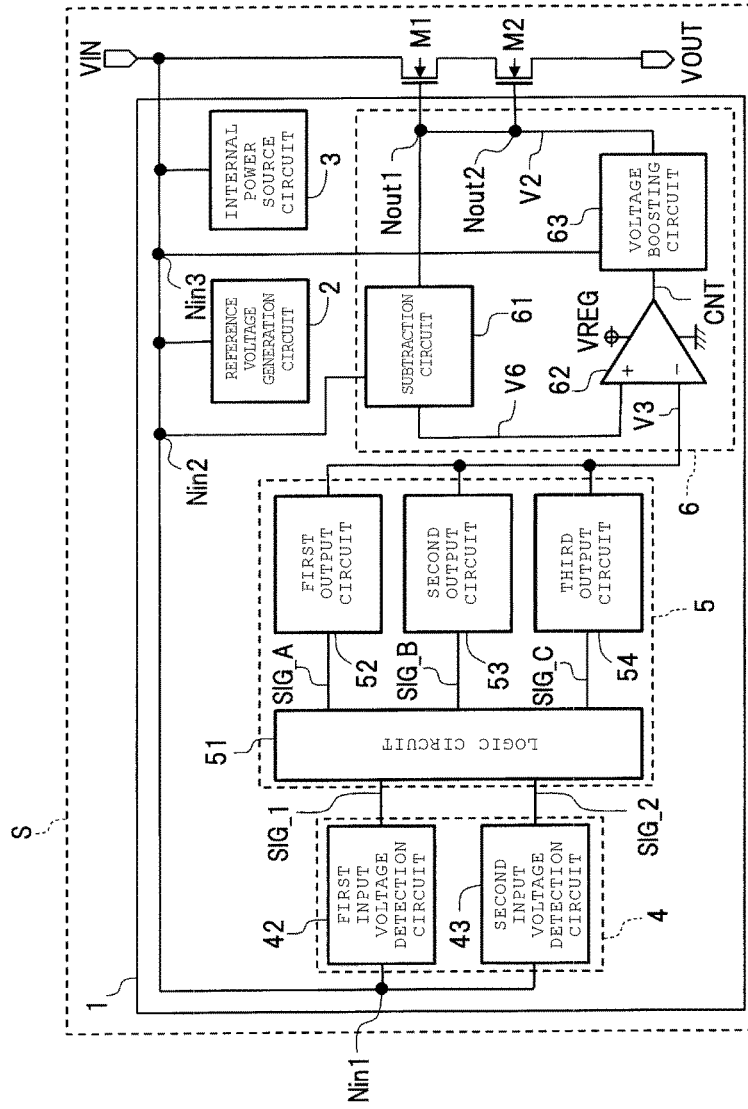
FIG. 1 is a block diagram of an output voltage control circuit according to an embodiment.

FIG. 1 is a block diagram of an output voltage control circuit 1 according to an embodiment. The output voltage control circuit 1 in FIG. 1 is a gate drive circuit that controls a gate voltage of MOS transistors M1 and M2 as an example of using an output voltage from the output voltage control circuit 1. The output voltage control circuit 1 can be applied to a load switch integrated circuit (IC) that is used for a mobile device, for example.

The output voltage control circuit 1 in FIG. 1 is on a substrate S. The MOS transistors M1 and M2 in FIG. 1 are external MOS transistors on the substrate S external to the output voltage control circuit 1. The output voltage control circuit 1 and various external circuits (which are not specifically illustrated in FIG. 1), such as a control circuit for controlling the output voltage control circuit 1 can be included in one chip.

The output voltage control circuit 1 generates a gate voltage V2 for the MOS transistors M1 and M2 by boosting an input voltage VIN provided from an external circuit. The output voltage control circuit 1 supplies the gate voltage to the gates of the MOS transistors M1 and M2.

Figure 2:
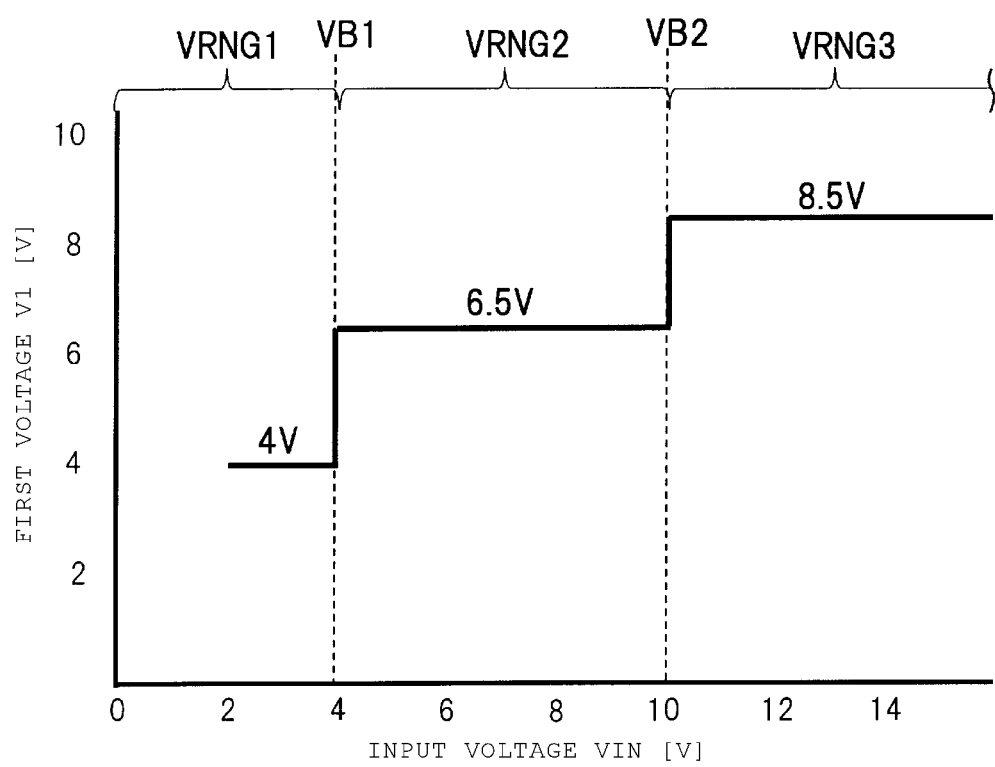
FIG. 2 is a diagram illustrating a first voltage of the output voltage control circuit.

FIG. 2 is a diagram illustrating first voltages V1 for the output voltage control circuit 1 according to this embodiment. A first voltage V1 corresponding to the input voltage VIN range as in the step-wise fashion depicted in FIG. 2 is used to boost the input voltage VIN to generate the gate voltage V2. In the circuit configuration of the output voltage control circuit 1, as will be described, the first voltage V1 is output in correlation with of the respective voltage ranges VRNG1 to VRNG3 for the input voltage VIN as depicted in FIG. 2, for example. The first voltage V1 has values that are different in a stepwise manner according to each of the plurality of voltage ranges VRNG1 to VRNG3. Specifically, the first voltage V1 has a larger value for each range VRNG1 to VRGN3 as the input voltage increases from one range to the next.

In the example of FIG. 2, three voltage ranges for input voltage VIN are depicted, namely a first voltage range VRNG1 of less than 4 V, a second voltage range VRNG2 of equal to or greater than 4 V and less than 10 V, and a third voltage range VRNG3 of equal to or greater than 10 V. As for voltages at boundaries between adjacent voltage ranges VRNG1 to VRNG3 in the example in FIG. 2 (hereinafter, also referred to as boundary voltages), a first boundary voltage VB1 is on the low voltage side is 4 V (e.g., just slightly less than 4 V), and a second boundary voltage VB2 on the high voltage side is 10 V (e.g., just slightly greater than 10 V). Also, the three first voltages V1 specifically corresponding to the three voltage ranges VRNG1 to VRNG3 are 4 V, 6.5 V, and 8.5 V, respectively. The correlation between the voltage ranges VRNG1 to VRNG3 and the first voltages V1 depicted in FIG. 2 is one that applies when the input voltage VIN increases. In a correlation when the input voltage VIN decreases, boundary voltages VB1 and VB2 may decrease slightly relative to those depicted in FIG. 2 due to a hysteresis effect of a first comparator 404 (see FIG. 3), which will be described later.

For boosting the input voltage VIN with the appropriate first voltage V1 as depicted in the example of FIG. 2, the output voltage control circuit 1 is configured as follows.

As illustrated in FIG. 1, the output voltage control circuit 1 includes a reference voltage generation circuit (generation unit) 2, an internal power source circuit 3, a detection unit 4, a selection unit 5, and an output unit 6. The selection unit 5 includes a logic circuit 51 and three output circuits 52 to 54. The output unit 6 includes a subtraction circuit 61, a second comparator 62, and a voltage boosting circuit 63.

(Reference Voltage Generation Circuit 2)

The reference voltage generation circuit 2 is a circuit that generates a constant reference voltage VBGR based on the input voltage VIN. The reference voltage generation circuit supplies the generated reference voltage VBGR to the detection unit 4, the selection unit 5, and the output unit 6. The reference voltage generation circuit 2 is a band gap reference, for example. The reference voltage VBGR may be 1.2 V, for example.

(Internal Power Source Circuit 3)

The internal power source circuit 3 is a circuit that generates an internal power source voltage VREG based on the input voltage VIN. The internal power source circuit 3 supplies the generated internal power source voltage VREG to the detection unit 4, the selection unit 5, and the output unit 6. The internal power source voltage VREG may be 3.0 V, for example.

(Detection Unit 4)

Figure 3:
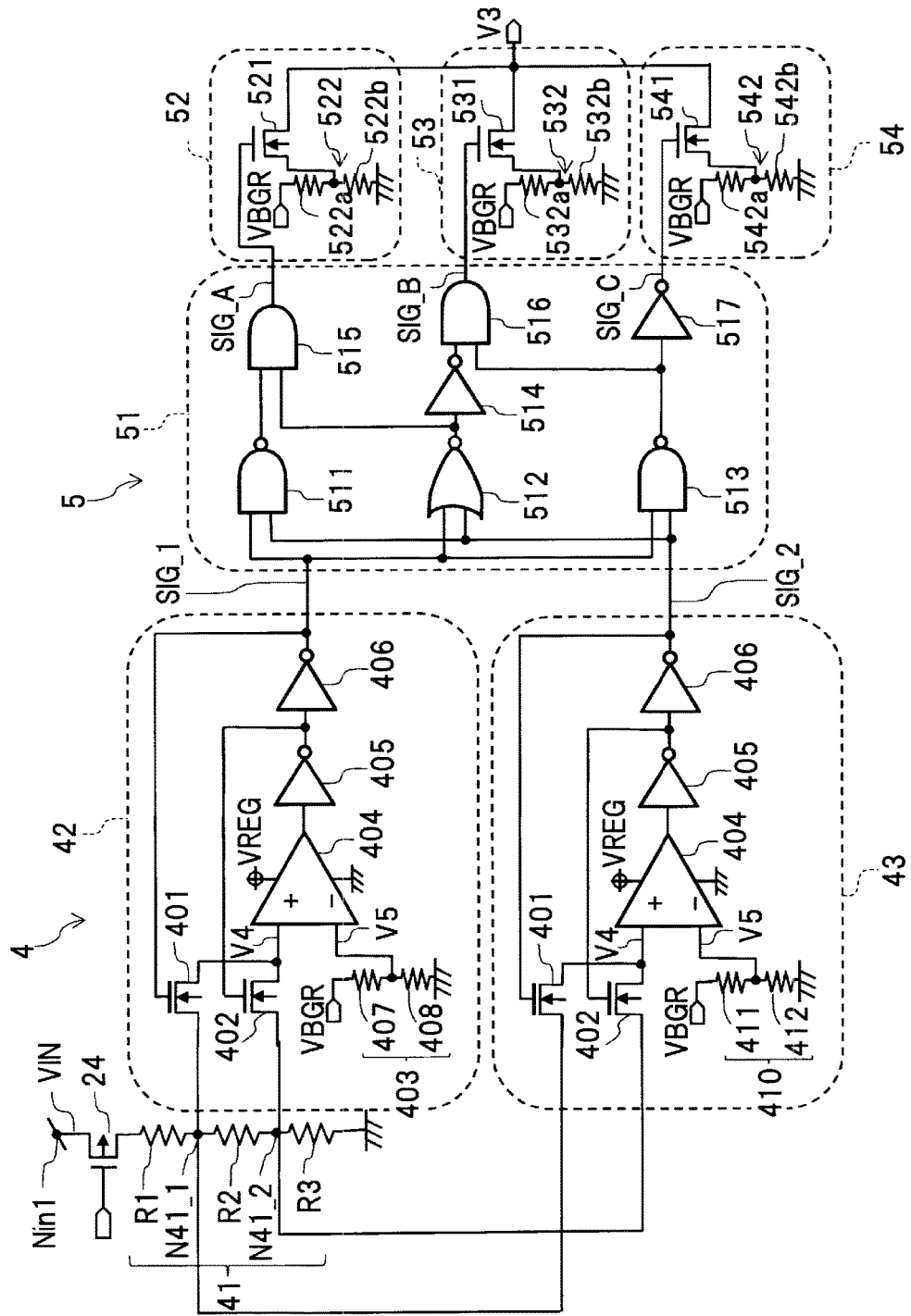
FIG. 3 is a circuit diagram of a detection unit and a selection unit of the output voltage control circuit.

FIG. 3 is a circuit diagram illustrating the detection unit 4 and the selection unit 5 of the output voltage control circuit 1 according to the embodiment. The detection unit 4 is a circuit that detects whether the input voltage VIN is above or below a boundary voltage. As illustrated in FIG. 3, the detection unit 4 includes a first voltage dividing resistor 41, a first input voltage detection circuit 42, and a second input voltage detection circuit 43.

(First Voltage Dividing Resistor 41)

The first voltage dividing resistor 41 is a resistor that provides a fourth voltage V4 that correlates with the input voltage VIN. The fourth voltage V4 is a voltage obtained by dividing the input voltage VIN. The voltage division in this embodiment is a resistor voltage divider that provides a portion of voltage applied to a portion of resistors from the voltage applied to all the plurality of resistors connected in series (the same is true in the following description).

As illustrated in FIG. 3, the first voltage dividing resistor 41 includes a first resistor R1, a second resistor R2, and a third resistor R3 that are connected in series in an order from the side of an input node Nin1 between the input node Nin1 of the voltage VIN and a ground potential. Either A first voltage dividing node N41_1 (between the first resistor R1 and the second resistor R2) and a second voltage dividing node N41_2 (between the second resistor R2 and the third resistor R3) are connectable to the input voltage detection circuits 42 and 43 according to an output level of the first comparator 404 (see FIG. 3), which will be described later. The second resistor R2 is provided in order to cause the first comparator 404 to have hysteresis.

When the second voltage dividing node N41_2 is connected to the input voltage detection circuits 42 and 43, the first voltage dividing resistor 41 provides the fourth voltage V4 by dividing the input voltage VIN in accordance with a voltage dividing ratio of the third resistor R3 and the sum of all three resistors. The fourth voltage V4 in accordance with the voltage dividing ratio of the third resistor R3 is represented by the following Equation (1).

$$V4 = \frac{R3}{R1 + R2 + R3} VIN \quad (1)$$

In Equation (1), R1 represents a resistance value of the first resistor R1, R2 represents a resistance value of the second resistor R2, R3 represents a resistance value of the third resistor R3, and VIN represents a voltage value of the input voltage VIN. These symbols in Equation (1) also have the same meaning in Equation (2), which will be described later.

In contrast, when the first voltage dividing node N41_1 is connected to the input voltage detection circuits 42 and 43, the first voltage dividing resistor 41 generates the fourth voltage V4 by dividing the input voltage VIN in accordance with a voltage dividing ratio of the combined resistance of the second resistor R2 and the third resistor R3 and the sum of all three resistors. The fourth voltage V4 in accordance with the voltage dividing ratio is represented by the following equation.

$$V4 = \frac{R2 + R3}{R1 + R2 + R3} VIN \quad (2)$$

The difference between the fourth voltage V4 in Equation (1) and the fourth voltage V4 in Equation (2) causes hysteresis of the first comparator 404. Here, the hysteresis is a difference between the input voltage VIN required for inverting an output of the first comparator 404 when the input voltage VIN increases and the input voltage VIN required for inverting the output of the first comparator 404 when the input voltage VIN decreases. Providing hysteresis can suppress oscillation/deviation of the output of the first comparator 404, which will be described later.

A switch 24 that controls the voltage input to the first voltage dividing resistor 41 is connected between the input node Nin1 of the voltage VIN and the first voltage dividing resistor 41. In the example of FIG. 3, the switch 24 is a pMOS transistor. In other examples, the switch 24 may be a transistor other than a pMOS transistor. The turning on and off of switch 24 may be controlled by an external circuit or logic circuit, which is not specifically illustrated in FIG. 3, in the output voltage control circuit 1. In order to prevent an erroneous operation of the output voltage control circuit 1, it is desirable to turn on the switch 24 only after an enable signal is input from the external circuit to the reference voltage generation circuit 2 and the internal power source circuit 3 and the respective circuits 2 and 3 are activated.

(First Input Voltage Detection Circuit 42)

The first input voltage detection circuit 42 is a circuit that compares the input voltage VIN with the first boundary voltage VB1 and outputs a result of the comparison indicating whether or not the input voltage VIN is above, below, or equal to the first boundary voltage VB1.

As illustrated in FIG. 3, the first input voltage detection circuit 42 includes a first MOS transistor 401, a second MOS transistor 402, a second voltage dividing resistor 403, a first comparator 404, a first inverter 405, and a second inverter 406.

The first MOS transistor 401 functions as a switch that connects or disconnects the first voltage dividing node N41_1 to or from voltage V4. Here, the first MOS transistor 401 is an n-conductivity-type transistor. The first MOS transistor 401 has a drain connected to the first voltage dividing node N41_1, a source connected to a non-inverted input terminal of the first comparator 404 (which is voltage V4), and a gate connected to an output terminal of the second inverter 406.

The second MOS transistor 402 functions as a switch that connects or disconnects the second voltage dividing node N41_2 to or from voltage V4. Here, the second MOS transistor 402 is an n-conductivity-type transistor. The second MOS transistor 402 has a drain connected to the second voltage dividing node N41_2, a source connected to the non-inverted input terminal of the first comparator 404 (V4), and a gate connected to an output terminal of the first inverter 405.

The second voltage dividing resistor 403 is a resistor that generates the fifth voltage V5 to be input to an inverted input terminal of the first comparator 404. The fifth voltage V5 is the first boundary voltage VB1. Specifically, the fifth voltage V5 is a voltage obtained by dividing the reference voltage VBGR and is equal to the first boundary voltage VB1 (see FIG. 2).

As illustrated in FIG. 3, the second voltage dividing resistor 403 includes a first resistor 407 and a second resistor 408 that are connected in series in an order from an input terminal for the reference voltage VBGR and a ground potential terminal/node. The second voltage dividing resistor 403 generates the fifth voltage V5 by dividing the reference voltage VBGR in accordance with a voltage dividing ratio of the first resistor 407 and the second resistor 408.

For example, it is assumed that the fourth voltage V4 is 0.4 V and the reference voltage VBGR is 1.2 V when the input voltage VIN is the first boundary voltage VB1 of 4 V. In this case, the fifth voltage V5 that is 0.4 V and can be generated by setting the resistance values of the first resistor 407 and the second resistor 408 such that the voltage dividing ratio is 2:1.

The first comparator 404 is a comparator that is provided for the purpose of detecting the value of the input voltage VIN and outputs a signal indicating a result of the comparison between the fourth voltage V4 and the fifth voltage V5 to the logic circuit 51 via the first inverter 405 and the second inverter 406. The first comparator 404 operates at the internal power source voltage VREG supplied from the internal power source circuit 3 and compares the fourth voltage V4 input to the non-inverted input terminal with the fifth voltage V5 input to the inverted input terminal.

If the fourth voltage V4 is less than the fifth voltage V5 (that is, if the input voltage VIN is less than the first boundary voltage VB1), the first comparator 404 outputs a low-level signal. In contrast, if the fourth voltage V4 is equal to or greater than the fifth voltage V5 (that is, if the input voltage VIN is equal to or greater than the first boundary voltage VB1), the first comparator 404 outputs a high-level signal.

The fourth voltage V4 and the fifth voltage V5 are voltages obtained by dividing the input voltage VIN and the reference voltage VBGR, respectively. Here, the fourth voltage V4 and the fifth voltage V5 are less than the internal power source voltage VREG. The first comparator 404 can operate normally since the voltages V4 and V5, which are less than the power source voltage VREG of the first comparator 404, are being compared.

The first inverter 405 has an input terminal connected to an output terminal of the first comparator 404 and an output terminal connected to both a gate of the second MOS transistor 402 and an input terminal of the second inverter 406. The first inverter 405 outputs an inverted signal (obtained by inverting the output signal from the first comparator 404) to the gate of the second MOS transistor 402 and the second inverter 406.

If the first comparator 404 outputs a low-level output signal, the second MOS transistor 402 is turned on by a high-level signal, that is, a voltage of equal to or greater than a threshold voltage input from the first inverter 405 to the gate. By turning on the second MOS transistor 402, the non-inverted input terminal (V4) of the first comparator 404 is connected to the second voltage dividing node N41_2 of the first voltage dividing resistor 41. By being connected to the second voltage dividing node N41_2, the fourth voltage V4 represented by Equation (1) is input to the non-inverted input terminal of the first comparator 404. In contrast, if the first comparator 404 outputs a high-level output signal, the second MOS transistor 402 is turned off by a low-level signal, that is, a voltage of less than the threshold voltage is input from the first inverter 405 to the gate.

The second inverter 406 has an output terminal connected to the gate of the first MOS transistor 401 and the logic circuit 51. The second inverter 406 outputs a first detection signal SIG_1 (obtained by inverting the output signal from the first inverter 405) to the gate of the first MOS transistor 401 and the logic circuit 51. The first detection signal SIG_1 has the same logic as that of the output signal of the first comparator 404.

If the first comparator 404 outputs a low-level output signal, the first MOS transistor 401 is turned off by the low-level first detection signal SIG_1 supplied to its gate. In contrast, if the first comparator 404 outputs a high-level output signal, the first MOS transistor 401 is turned on by the high-level first detection signal SIG_1. By turning on the first MOS transistor 401, the non-inverted input terminal (V4) of the first comparator 404 is connected to the first voltage dividing node N41_1 of the first voltage dividing resistor 41. By being connected to the first voltage dividing node N41_1, the fourth voltage V4 represented by Equation (2) is input to the non-inverted input terminal of the first comparator 404.

(Second Input Voltage Detection Circuit 43)

The second input voltage detection circuit 43 is a circuit that compares the input voltage VIN to the second boundary voltage VB2 and outputs a result of the comparison indicating whether the input voltage VIN is above, below or equal to the second boundary voltage VB2.

As illustrated in FIG. 3, the second input voltage detection circuit 43 is the same as the first input voltage detection circuit 42 excepting that the second input voltage detection circuit 43 includes a third voltage dividing resistor 410 instead of the second voltage dividing resistor 403. Hereinafter, a configuration of the second input voltage detection circuit 43 will be described by focusing mainly on its differences from the first input voltage detection circuit 42.

The third voltage dividing resistor 410 is a resistor that generates the fifth voltage V5 to be input to the inverted input terminal of the first comparator 404 by dividing the reference voltage VBGR in a similar manner as the second voltage dividing resistor 403. However, the resistance value of the third voltage dividing resistor can be different from that of the second voltage dividing resistor 403. The fifth voltage V5 as generated by the third voltage dividing resistor 410 has the same value as the fourth voltage V4 when the input voltage VIN is equal to the second boundary voltage VB2.

As illustrated in FIG. 3, the third voltage dividing resistor 410 includes a first resistor 411 and a second resistor 412 connected in series in an order from an input terminal for the reference voltage VBGR to a ground potential terminal/node. The third voltage dividing resistor 410 generates the fifth voltage V5 by dividing the reference voltage VBGR in accordance with the voltage dividing ratio of the second resistor 412.

For example, the fourth voltage V4 is 1.0 V and the reference voltage VBGR is 1.2 V when the input voltage VIN is 10 V (that is, VIN is equal to the second boundary voltage VB2). In this case, the fifth voltage V5 is 1.0 V and can be obtained if the resistance values of the first resistor 411 and the second resistor 412 are set such that the voltage dividing ratio is 1:5.

If the fourth voltage V4 is less than the fifth voltage V5, that is, if the input voltage VIN is less than the second boundary voltage VB2, the first comparator 404 outputs a low-level signal. In this case, the second MOS transistor 402 is turned on by the first inverter 405 providing a high-level output. Also, the first MOS transistor 401 is turned off by the second inverter 406 outputting a low-level second detection signal SIG_2.

In contrast, if the fourth voltage V4 is equal to or greater than the fifth voltage V5 (that is, if the input voltage VIN is equal to or greater than the second boundary voltage VB2), the first comparator 404 outputs a high-level signal. In this case, the second MOS transistor 402 is turned off by the first inverter 405 providing a low-level output. Also, the first MOS transistor 401 is turned on by the second inverter 406 outputting a high-level second detection signal SIG_2.

The detection unit 4 with the aforementioned configuration can detect and output a detection result indicating that the input voltage VIN is less than the first boundary voltage VB1 by outputting a low-level first detection signal SIG_1 and a low-level second detection signal SIG_2. The detection unit 4 can detect and output a detection resulting indicating that the input voltage VIN is equal to or greater than the first boundary voltage VB1 and less than the second boundary voltage VB2 by outputting a high-level first detection signal SIG_1 and a low-level second detection signal SIG_2. And, the detection unit 4 can detect and output a detection resulting indicating that the input voltage VIN is equal to or greater than the second boundary voltage VB2 by outputting a high-level first detection signal SIG_1 and a high-level second detection signal SIG_2. That is, the detection unit 4 can provide the results of detecting the input voltage VIN into three different signal patterns so as to establish a one-to-one correlation with the three first voltages V1 corresponding to the input voltage ranges VRNG1 to VRNG3. By doing so, it is possible to simply and appropriately select the appropriate level for the first voltage V1 in accordance with the input voltage VIN.

When the input voltage VIN exceeds the first boundary voltage VB1, the output of the first comparator 404 is switched from the low level to the high level, the second MOS transistor 402 is turned off, and the first MOS transistor 401 is turned on. The above operations leads to an increase of the value of the fourth voltage V4 to be input to the first comparator 404 of the first input voltage detection circuit 42 from the value of Equation (1) to the value of Equation (2). Similarly, when the input voltage VIN exceeds the second boundary voltage VB2, the value of the fourth voltage V4 to be input to the first comparator 404 of the second input voltage detection circuit 43 can increase from the value of Equation (1) to the value of Equation (2). This can suppress deviation of the output of the first comparator 404 even if the value of the input voltage VIN becomes unstable around the boundary voltages VB1 and VB2.

(Selection Unit 5)

The selection unit 5 is a circuit that selects the first voltage V1 corresponding to the input voltage VIN as detected by the detection unit 4 from among the plurality of first voltages V1. Three output circuits 52, 53, and 54 of the selection unit 5 are circuits that correspond to the three different first voltages V1, respectively and output the third voltage V3 corresponding to first voltage V1 to the output unit 6. In the embodiment, the third voltage V3 is a voltage obtained by dividing the reference voltage VBGR and has a value of first constant multiplication of the first voltages V1 corresponding to the output circuits 52 to 54 that outputs the third voltage V3, which is greater than zero and less than 1. The logic circuit 51 of the selection unit 5 is a circuit that selects one of the output circuits 52 to 54 to output the third voltage V3 from among the plurality of output circuits 52 to 54 according to the detected input voltage VIN.

(Logic Circuit 51)

As illustrated in FIG. 3, the logic circuit 51 includes a first NAND gate 511, a NOR gate 512, a second NAND gate 513, a first inverter 514, a first AND gate 515, a second AND gate 516, and a second inverter 517.

The first NAND gate 511 has two input terminals connected to output terminals of the second inverters 406 of the input voltage detection circuits 42 and 43, respectively, and an output terminal connected to an input terminal of the first AND gate 515. The first NAND gate 511 outputs a signal indicating NAND between the first detection signal SIG_1 and the second detection signal SIG_2 to the first AND gate 515.

The NOR gate 512 has two input terminals connected to the output terminals of the second inverters 406 of the input voltage detection circuits 42 and 43, respectively, and an output terminal connected to the first AND gate 515 and the input terminal of the first inverter 514. The NOR gate 512 outputs a signal indicating NOR between the first detection signal SIG_1 and the second detection signal SIG_2 to the first AND gate 515 to the first inverter 514.

The second NAND gate 513 has two input terminals connected to the output terminals of the second inverters 406 of the input voltage detection circuits 42 and 43, respectively, and an output terminal connected to the second AND gate 516 and the input terminal of the second inverter 517. The second NAND gate 513 outputs a signal indicating NAND between the first detection signal SIG_1 and the second detection signal SIG_2 to the second AND gate 516 and the second inverter 517.

The output terminal of the first inverter 514 is connected to the input terminal of the second AND gate 516. The first inverter 514 outputs an inverted signal of an output signal of the NOR gate 512 to the second AND gate 516.

The output terminal of the first AND gate 515 is connected to the first output circuit 52. The first AND gate 515 outputs a signal SIG_A indicating a logical product between the output signal of the first NAND gate 511 and the output signal of the NOR gate 512 to the first output circuit 52. High-level SIG_A is a signal for selecting the first output circuit 52.

The output terminal of the second NAND gate 516 is connected to the second output circuit 53. The second AND gate 516 outputs a signal SIG_B indicating a logical product between the output signal of the first inverter 514 and the output signal of the second NAND gate 513 to the second output circuit 53. High-level SIG_B is a signal for selecting the second output circuit 53.

The output terminal of the second inverter 517 is connected to the third output circuit 54. The second inverter 517 outputs an inverted signal SIG_C of the output signal of the second NAND gate 513 to the third output circuit 54. High-level SIG_C is a signal for selecting the third output circuit 54.

One of SIG_A, SIG_B, and SIG_C is brought into a high level while the others are brought into a low level. That is, one of the three output circuits 52 to 54 is selected to output the third voltage V3.

Specifically, if the first detection signal SIG_1 and the second detection signal SIG_2 are in the low level, the SIG_A is brought into the high level, and the first output circuit 52 is selected. If the first detection signal SIG_1 is in the high level and the second detection signal SIG_2 is in the low level, SIG_B is brought into the high level, and the second output circuit 53 is selected. If the first detection signal SIG_1 and the second detection signal SIG_2 are in the high level, SIG_C is brought into the high level, and the third output circuit 54 is selected.

(First Output Circuit 52)

The first output circuit 52 is a circuit that selects the first voltage V1 corresponding to the first voltage range VRNG1 from among the three first voltage V1 and outputs the corresponding third voltage V3 to the output unit 6. The first output circuit 52 includes the first MOS transistor 521 and the first voltage dividing resistor 522.

The first MOS transistor 521 is an n-type conductivity-type transistor. The first MOS transistor 521 has a gate connected to the output terminal of the first AND gate 515, a drain connected to the first voltage dividing resistor 522, and a source connected to the inverted input terminal of the second comparator 62 (see FIG. 1).

The first voltage dividing resistor 522 generates a third voltage V3 proportional to the first voltage V1 by dividing the reference voltage VBGR. As illustrated in FIG. 3, the first voltage dividing resistor 522 includes a first resistor 522a and a second resistor 522b that are connected in series from an input terminal of the reference voltage VBGR to a ground potential terminal/node. The first voltage dividing resistor 522 generates the third voltage V3 by dividing the reference voltage VBGR in accordance with a voltage dividing ratio of the second resistor 522b.

For example, when it is assumed that the first voltage V1 selected by the first output circuit 52 is 4 V and the reference voltage VBGR is 1.2 V, then, if the first resistor 522a is set to 1000 kΩ and the second resistor 522b is set to 200 kΩ, it is possible to obtain the third voltage V3 of 0.2 V that is 0.05 times as high as the first voltage V1 of 4 V, as the third voltage V3 that has the value of first constant multiplication (0.05) multiplied by the first voltage V1.

The first MOS transistor 521 is turned on by high-level SIG_A input from the first AND gate 515 to the gate. By turning on the first MOS transistor 521, the third voltage V3 generated by the first voltage dividing resistor 522 is output to the second comparator 62 (see FIG. 1).

(Second Output Circuit 53)

The second output circuit 53 is a circuit that selects the first voltage V1 corresponding to the second voltage range VRNG2 from among the three first voltages V1 and outputs the corresponding third voltage V3 to the output unit 6. The second output circuit 53 includes a second MOS transistor 531 and a second voltage dividing resistor 532.

The second MOS transistor 531 is an n-type conductivity-type transistor. The second MOS transistor 531 has a gate connected to the output terminal of the second AND gate 516, a drain connected to the second voltage dividing resistor 532, and a source connected to the inverted input terminal of the second comparator 62.

The second voltage dividing resistor 532 generates the third voltage V3 that is proportional to the value of the first voltage V1 from the second output circuit 53 by dividing the reference voltage VBGR. As illustrated in FIG. 3, the second voltage dividing resistor 532 includes a first resistor 532a and a second resistor 532b connected in series. The second voltage dividing resistor 532 generates the third voltage V3 by dividing the reference voltage VBGR in accordance with a voltage dividing ratio of the second resistor 532b.

For example, when it is assumed that the first voltage V1 selected by the second output circuit 53 is 6.5 V and the reference voltage VBGR is 1.2 V, then, if the first resistor 532a is set to 875 kΩ and the second resistor 532b is 325 kΩ, it is possible to obtain the third voltage V3 of 0.325 V that is 0.05 times as high as the first voltage V1 of 6.5 V.

The second MOS transistor 531 is turned on by high-level SIG_B input from the second AND gate 516. By turning on the second MOS transistor 531, the third voltage V3 generated by the second voltage dividing resistor 532 is output to the second comparator 62.

(Third Output Circuit 54)

The third output circuit 54 is a circuit that selects the first voltage V1 corresponding to the third voltage range VRNG3 from among the three first voltage V1 and outputs the corresponding third voltage V3 to the output unit 6. The third output circuit 54 includes a third MOS transistor 541 and a third voltage dividing resistor 542.

The third MOS transistor 541 is an n-conductivity-type transistor. The third MOS transistor 541 has a gate connected to the output terminal of the second inverter 517, a drain connected to the third voltage dividing resistor 542, and a source connected to the inverted input terminal of the second comparator 62.

The third voltage dividing resistor 542 generates the third voltage V3 that has the value proportional to the first voltage V1 by dividing the reference voltage VBGR. As illustrated in FIG. 3, the third voltage dividing resistor 542 includes a first resistor 542a and a second resistor 542b that are connected in series. The third voltage dividing resistor 542 generates the third voltage V3 by dividing the reference voltage VBGR at a voltage dividing ratio of the second resistor 542b.

For example, when it is assumed that the first voltage V1 selected by the third output circuit 54 is 8.5 V and the reference voltage VBGR is 1.2 V, then, if the first resistor 542a is set to 775 kΩ and the second resistor 542b is set to 425 kΩ, it is possible to obtain the third voltage V3 of 0.425 V that is 0.05 times as high as the first voltage V1 of 8.5 V.

The third MOS transistor 541 is turned on by high-level SIG_C input from the second inverter 517. By turning on the third MOS transistor 541, the third voltage V3 generated by the third voltage dividing resistor 542 is output to the second comparator 62 via the third MOS transistor 541.

A selection unit 5 with the aforementioned configuration can output high-level SIG_A from the logic circuit 51 to the first output circuit 52 and, as a result, output a third voltage V3 corresponding to the first voltage range VRNG1 from the first output circuit 52 to the output unit 6 when the input voltage VIN is less than the first boundary voltage VB1. The selection unit 5 can output high-level SIG_B from the logic circuit 51 to the second output circuit 53 and, as a result, output a third voltage V3 corresponding to the second voltage range VRNG2 from the second output circuit 53 to the output unit 6 when the input voltage VIN is equal to or greater than the first boundary voltage VB1 and less than the second boundary voltage VB2. The selection unit 5 can output high-level SIG_C from the logic circuit 51 to the third output circuit 54 and output, as a result, a third voltage V3 corresponding to the third voltage range VRNG3 from the third output circuit 54 to the output unit 6 when the input voltage VIN is equal to or greater than the second boundary voltage VB2.

Therefore, the detection unit 4 and the selection unit 5 can simply and appropriately select the first voltage V1 in accordance with the input voltage VIN without requiring any detection of the output voltage (VOUT).

(Output Unit 6)

The output unit 6 (see FIG. 1) is a circuit that generates the gate voltage V2 by boosting the input voltage VIN with the first voltage V1 selected by the selection unit 5. The subtraction circuit 61 of the output unit 6 is a circuit that generates the sixth voltage V6 in accordance with a difference between the gate voltage V2 and the input voltage VIN (via node Nin2). The sixth voltage V6 is a voltage obtained by subtracting an eighth voltage V8 obtained by scaling the input voltage VIN with the first constant multiplication from a seventh voltage V7 obtained by scaling the gate voltage V2 with the first constant multiplication. The voltage boosting circuit 63 of the output unit 6 is a circuit for boosting the input voltage VIN. The second comparator (boost comparator) 62 of the output unit 6 is a comparator that compares the third voltage V3 with the sixth voltage V6 and then outputs (to the voltage boosting circuit 63) a voltage boosting control signal CNT, which provides an instruction for boosting or stopping boosting of the input voltage VIN according to a result of the comparison.

As illustrated in FIG. 1, the subtraction circuit 61 is connected to the input node Nin2 having the voltage VIN, the output nodes Nout1 and Nout2 having the gate voltage V2, and the non-inverted input terminal of the second comparator 62. An output terminal of the second comparator 62 is connected to an input terminal of the voltage boosting circuit 63. An output terminal of the voltage boosting circuit 63 is connected to the output nodes Nout1 and Nout2.

(Subtraction Circuit 61)

Figure 4:
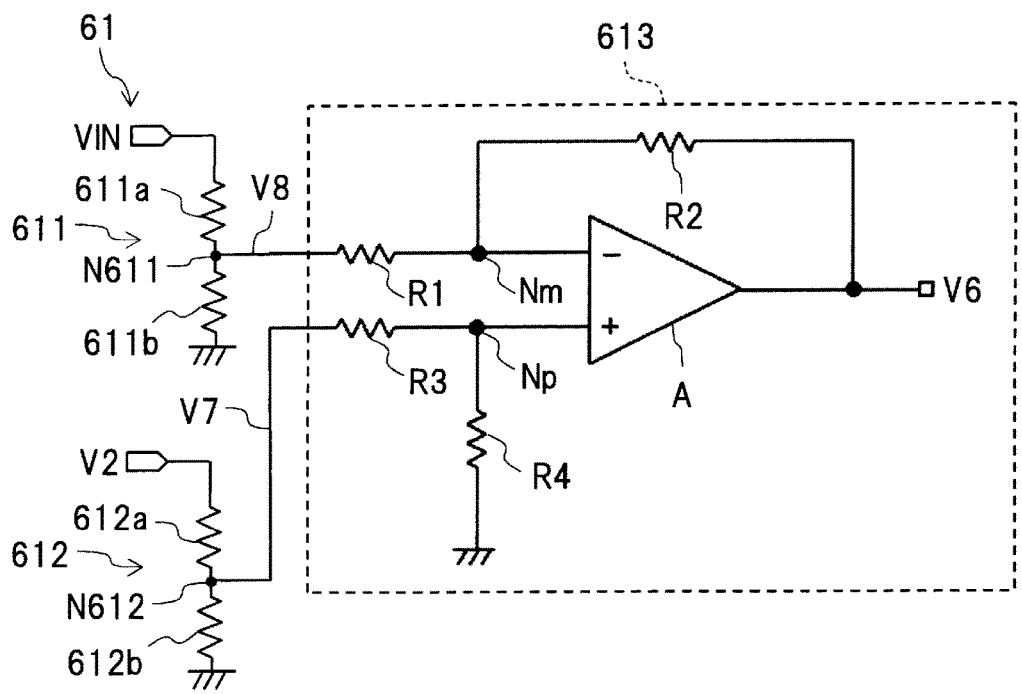
FIG. 4 is a circuit diagram illustrating a subtraction circuit of the output voltage control circuit.

FIG. 4 is a circuit diagram illustrating an example structure of the subtraction circuit 61 of the output voltage control circuit 1 according to the embodiment. As illustrated in FIG. 4, the subtraction circuit 61 includes a first voltage dividing resistor 611, a second voltage dividing resistor 612, and a differential amplification circuit 613.

The first voltage dividing resistor 611 is a resistor that generates the eighth voltage V8. The first voltage dividing resistor 611 includes a first resistor 611a and a second resistor 611b that are connected in series in an order from the input terminal of the voltage VIN to the ground potential terminal/node. The first voltage dividing resistor 611 generates the eighth voltage V8 by scaling the input voltage VIN with the first constant multiplication in accordance with a voltage dividing ratio of the second resistor 611b.

The second voltage dividing resistor 612 is a resistor that generates the seventh voltage V7. The second voltage dividing resistor 612 includes a first resistor 612a and a second resistor 612b that are connected in series in an order from an input terminal at the gate voltage V2 to the ground potential terminal/node. The second voltage dividing resistor 612 generates the seventh voltage V7 by scaling the gate voltage V2 with the first constant multiplication at a voltage dividing ratio of the second resistor 612b.

The differential amplification circuit 613 is a circuit that generates the sixth voltage V6 by subtracting the eighth voltage V8 from the seventh voltage V7. The differential amplification circuit 613 includes an operational amplifier A and first to fourth resistors R1 to R4. The operational amplifier A has an inverted input terminal connected to a node N611 of the first voltage dividing resistor 611, a non-inverted input terminal connected to a node N612 of the second voltage dividing resistor 612, and an output terminal connected to the input terminal of the second comparator 62. The operational amplifier A may operate at the internal power source voltage VREG.

The first resistor R1 is connected between the node N611 and the inverted input terminal of the operational amplifier A. The second resistor R2 has one end connected to a node Nm that is located between the first resistor R1 and the inverted input terminal of the operational amplifier A and the other end connected to an output terminal of the operational amplifier A. The third resistor R3 is connected between node N612 of the second voltage dividing resistor 612 and the non-inverted input terminal of the operational amplifier A. The fourth resistor R4 has one end connected to a node Np that is located between the third resistor R3 and the non-inverted input terminal of the operational amplifier A and the other end connected to the ground potential. Here, the first to fourth resistors R1 to R4 each have the same resistance value. The resistance value of the first to fourth resistors R1 to R4 may be 2 MΩ, for example.

In the differential amplification circuit 613, the following equation can be established in relation to inversion amplification of the operational amplifier A.

$$\frac{V8 - Vm}{R1} = \frac{Vm - V6}{R2} \quad (3)$$

In Equation (3), R1 represents a resistance value of the first resistor R1, R2 represents a resistance value of the second resistor R2, V6 represents a voltage value of the sixth voltage V6, V8 represents a voltage value of the eighth voltage V8, and Vm represents a voltage value at the node Nm (the same correspondence is true for the labels in the following description).

In the differential amplification circuit 613, the following equation is established in relation to non-inversion amplification of the operational amplifier A.

$$\frac{V7 - Vp}{R3} = \frac{Vp}{R4} \quad (4)$$

In Equation (4), R3 represents a resistance value of the third resistor R3, R4 represents a resistance value of the fourth resistor R4, V7 represents a voltage value of the seventh voltage V7, and Vp represents a voltage value of the node Np (the same correspondence is true for the labels in the following description).

Here, Equation (3) can be modified to the following equation (5) since R1=R2.

$$V6 = 2Vm - V8 \quad (5)$$

Since R3=R4 and Vp=Vm due to of the high gain of the operational amplifier A, Equation (4) can be modified to the following equation.

$$\frac{V7}{2} = Vm \quad (6)$$

Based on Equations (5) and (6), the following equation can be established.

$$V6 = V7 - V8 \quad (7)$$

The operational amplifier A outputs the sixth voltage V6 with a value represented by Equation (7) to the inverting input (−) terminal of the second comparator 62.

(Second Comparator 62)

The second comparator 62 operates at the internal power source voltage VREG and compares the third voltage V3 (input to the inverting input terminal) to the sixth voltage V6 (input to the non-inverted input (+) terminal).

If the third voltage V3 is greater than the sixth voltage V6, the second comparator 62 outputs a voltage boosting control signal CNT with a low-level signal value to provide an instruction to the voltage boosting circuit 63 to boost the input voltage VIN.

In contrast, if the sixth voltage V6 is greater than the third voltage V3, the second comparator 62 outputs a voltage boosting control signal CNT with a high-level to provide an instruction to the voltage boosting circuit 63 to stop boosting the input voltage VIN.

The second comparator 62 can determine whether or not the gate voltage V2 has increased by the first voltage V1 selected by the selection unit 5 relative to the input voltage VIN based on the sixth voltage V6 in accordance with the difference between the gate voltage V2 and the input voltage VIN. If the voltage is not sufficiently boosted, that is, if V3>V6, the voltage boosting continues. If the voltage is sufficiently boosted, that is, if V6>V3, the voltage boosting is stopped. By stopping the voltage boosting, it is possible to prevent the gate voltage V2 from exceeding voltage tolerances of the MOS transistors M1 and M2.

As already described, the third voltage V3 is obtained by dividing the reference voltage VBGR. The sixth voltage V6 is a difference between the voltage V7 (obtained by dividing the gate voltage V2) and the voltage V8 (obtained by dividing the input voltage VIN). Therefore, the third voltage V3 and the sixth voltage V6 will be less than the internal power source voltage VREG. The second comparator 62 can thus operate normally since the voltages V3 and V6 being compared are less than the power source voltage VREG of the second comparator 62.

(Voltage Boosting Circuit 63)

Figure 5:
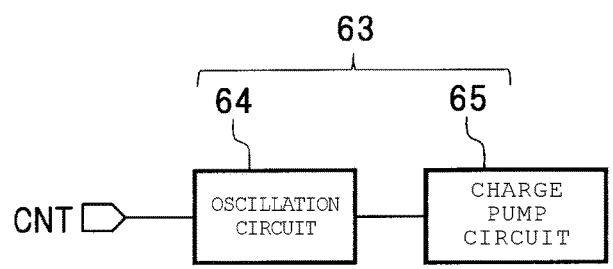
FIG. 5 is a block diagram illustrating a voltage boosting circuit of the output voltage control circuit.

FIG. 5 is a block diagram illustrating an example structure of a voltage boosting circuit 63 of the output voltage control circuit 1 according to an embodiment. As illustrated in FIG. 5, the voltage boosting circuit 63 includes an oscillation circuit 64 and a charge pump circuit 65. The oscillation circuit 64 is a circuit that generates clock pulses for driving the charge pump circuit 65 according to the voltage boosting control signal CNT from the second comparator 62. The charge pump circuit 65 is a circuit that boosts the input voltage VIN with the first voltage V1 (selected by the selection unit 5) according to the clock pulses from the oscillation circuit 64. The oscillation circuit 64 has an input terminal connected to the output terminal of the second comparator 62 and an output terminal connected to an input terminal of the charge pump circuit 65. An output terminal of the charge pump circuit 65 is connected to output nodes Nout1 and Nout2.

Figure 6:
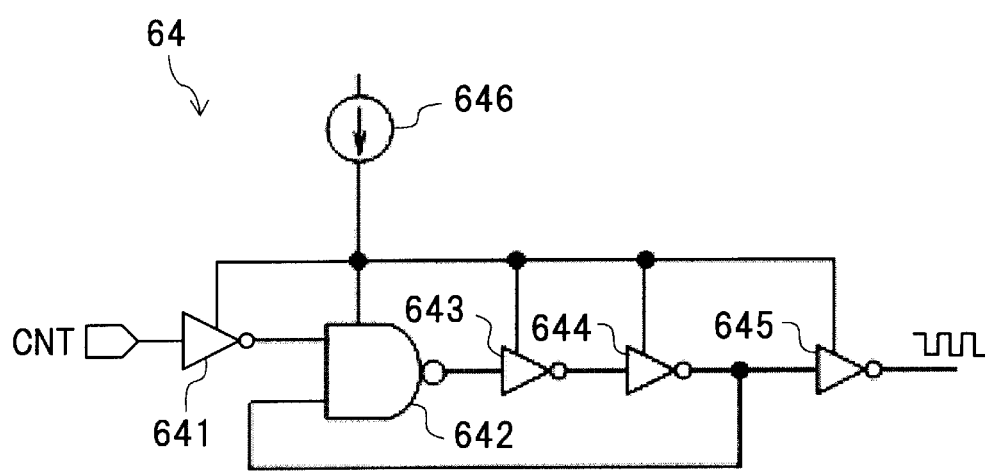
FIG. 6 is a circuit diagram illustrating an oscillation circuit of the output voltage control circuit.

FIG. 6 is a circuit diagram illustrating an example structure of an oscillation circuit 64 of the output voltage control circuit 1 according to an embodiment. As illustrated in FIG. 6, the oscillation circuit 64 is a ring oscillator, for example.

The oscillation circuit 64 includes a first inverter 641, a NAND gate 642, a second inverter 643, a third inverter 644, and a fourth inverter 645 that are connected in series from the input side, and a constant current source 646 that is connected to each of elements 641 to 645. The oscillation circuit 64 has a ring structure in which an output terminal of the third inverter 644 is connected to a second input terminal of the NAND gate 642. The elements 641 to 645 are formed by CMOS transistors, which are not separately illustrated. To make an oscillation frequency variable by limiting operation currents of the elements 641 to 645, the constant current source 646 is connected to a current path of various internal CMOSs transistors that form the elements 641 to 645.

If the low-level voltage boosting control signal CNT is input to the first inverter 641, the first input terminal of the NAND gate 642 is brought into the high level. In this case, the level of the output terminal of the NAND gate 642 also changes according to a change in the level of the second input terminal of the NAND gate 642. Therefore, the oscillation circuit 64 oscillates to generate clock pulses when the voltage boosting control signal CNT is in the low level. By generating the clock pulses, the charge pump circuit 65 can be driven.

In contrast, if the high-level voltage boosting control signal CNT is input to the first inverter 641, the first input terminal of the NAND gate 642 is brought into the low level. In this case, the output terminal of the NAND gate 642 is fixed at the high level regardless of the change in the level of the second input terminal of the NAND gate 642. Therefore, the oscillation circuit 64 does not oscillate and does not generate the clock pulses when the voltage boosting control signal CNT is in the high level. By not generating the clock pulses, it is possible to stop the driving the charge pump circuit 65.

The oscillation circuit 64 can shorten delay times by increasing the current level supplied by the constant current source 646. By shortening the delay time, the oscillation frequency of the oscillation circuit 64 can be increased. By increasing the oscillation frequency, a voltage boosting speed can be increased. The current of the constant current source 646 may be controlled by a control signal supplied from an external circuit or may be controlled by a control signal from an internal logic circuit. The oscillation frequency of the oscillation circuit 64 may be set to 4.4 MHz, for example.

Figure 7:
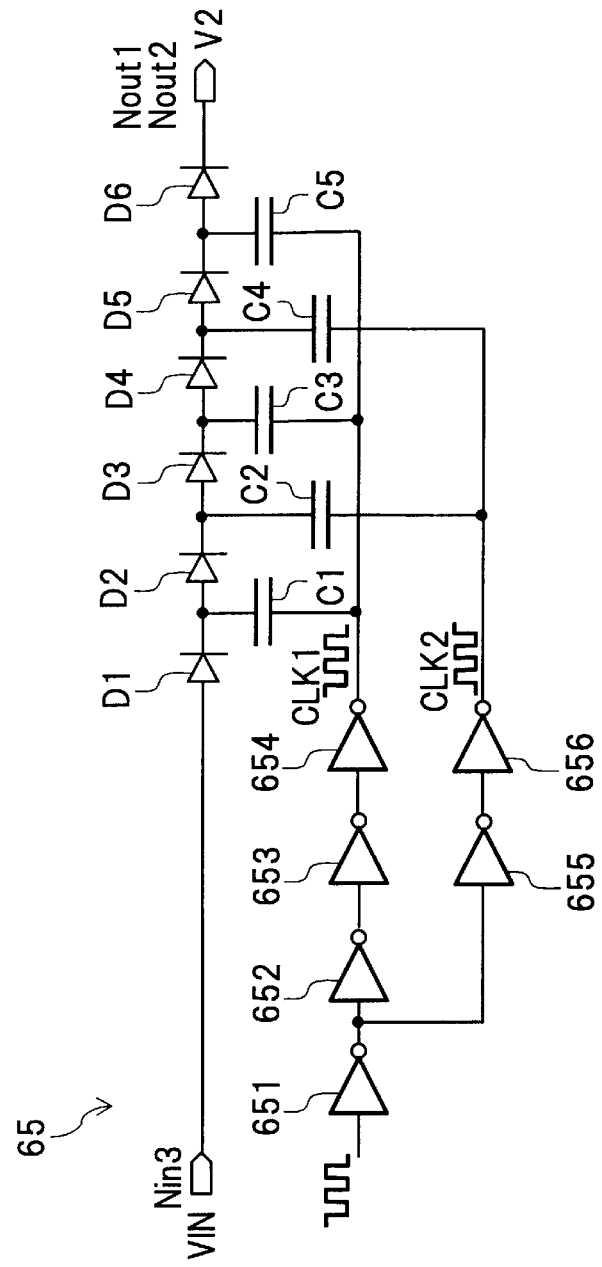
FIG. 7 is a circuit diagram illustrating a charge pump circuit of the output voltage control circuit.

FIG. 7 is a circuit diagram illustrating an example structure of the charge pump circuit 65 of the output voltage control circuit 1 according to an embodiment. As illustrated in FIG. 7, the charge pump circuit 65 is a Dickson-type charge pump, for example.

As illustrated in FIG. 7, the charge pump circuit 65 includes first to sixth rectifying elements D1 to D6, first to fifth capacitors C1 to C5, and first to sixth inverters 651 to 656. The capacitance of the first to fifth capacitors C1 to C5 may be 10 pF, for example.

The first to sixth rectifying elements D1 to D6 are connected in series between an input node Nin3 of the voltage VIN and the output nodes Nout1 and Nout2 of the gate voltage V2. The first to sixth rectifying elements D1 to D6 may be diodes or diode-connected MOS transistors.

The first capacitor C1 has one end connected to one end of each of the third capacitor C3 and the fifth capacitor C5 and the other end connected between the first rectifying element D1 and the second rectifying element D2. The other end of the third capacitor C3 is connected between the third rectifying element D3 and the fourth rectifying element D4. The other end of the fifth capacitor C5 is connected between the fifth rectifying element D5 and the sixth rectifying element D6.

The second capacitor C2 has one end connected to one end of the fourth capacitor C4 and the other end connected between the second rectifying element D2 and the third rectifying element D3. The other end of the fourth capacitor C4 is connected between the fourth rectifying element D4 and the fifth rectifying element D5.

The first to fourth inverters 651 to 654 are connected in series between the output terminal of the oscillation circuit 64 and one end of the first, third, and fifth capacitors C1, C3, and C5. The first to fourth inverters 651 to 654 input a clock pulse CLK1 having the same logic as that of the clock pulse output from the oscillation circuit 64.

The fifth and sixth inverters 655 and 656 are connected in series between the output terminal of the first inverter 651 and one end of the second and fourth capacitors C2 and C4. The fifth and sixth inverters 655 and 656 input a clock pulse CLK2 (obtained by inverting the logic of the clock pulse output from the oscillation circuit 64) to the second and fourth capacitors C2 and C4.

For example, if the high-level clock pulse CLK1 is input from the fourth inverter 654 to the first capacitor C1 in a state where electric charge has accumulated in the first capacitor C1 from the input voltage VIN, the accumulated electric charge will be output from the first capacitor C1. At this time, the low-level clock pulse CLK2 is being input from the sixth inverter 656 to the second capacitor C2 (that is adjacent to the first capacitor C1). Therefore, the electric charge output from the first capacitor C1 is accumulated in the second capacitor C2. When the logic of the clock pulse is inverted, the electric charge accumulated in the second capacitor C2 is output from the second capacitor C2 and accumulated in the third capacitor C3 on the downstream side. By repeating such operations, the amount of electric charge accumulated in the fifth capacitor C5 on the most downstream side increases. The input voltage VIN can then be boosted by releasing the electric charge from the fifth capacitor C5.

(Operation Example)

Next, description will be given of a specific operation example of the output voltage control circuit 1 configured as described above. FIG. 8 is a diagram illustrating a truth value table of the output voltage control circuit 1 according to an embodiment. The output voltage control circuit 1 operates based on the truth value table in FIG. 8 according to the range of the input voltage VIN. Hereinafter, the operation example of the output voltage control circuit 1 will be described for certain the input voltage VIN levels and ranges. In the operation example t described below, it is assumed that the output voltage control circuit 1 satisfies the following conditions.

First boundary voltage VB1=4 V
Second boundary voltage VB2=10 V
First voltage V1 for the first voltage range VRNG1=4 V
First voltage V1 for the second voltage range VRNG2=6.5 V
First voltage V1 for the third voltage range VRNG3=8.5 V First voltage dividing resistor 41: R1=4450 kΩ, R2=50 kΩ, R3=500 kΩ
Fifth voltage V5 of first input voltage detection circuit 42 is equal to 0.4 V
Fifth voltage V5 of second input voltage detection circuit 43 is equal to 1.0 V
Third voltage V3 is 0.05 times as high as first voltage V1
Seventh voltage V7 is 0.05 times as high as gate voltage V2
Eighth voltage V8 is 0.05 times as high as input voltage VIN (When Input Voltage VIN is 3 V)

First, the second MOS transistors 402 of the input voltage detection circuits 42 and 43 are in the OFF state in an initial state immediately after the output voltage control circuit 1 is first activated. Therefore, a non-inverted input of the first comparators 404 of the input voltage detection circuits 42 and 43 is 0 V. In contrast, the fifth voltages V5 of 0.4 V and 1.0 V are input to the inverted input terminals of the first comparators 404 of the input voltage detection circuits 42 and 43. Therefore, outputs of the first comparators 404 of the input voltage detection circuits 42 and 43 are brought into the low level. The outputs of the first comparators 404 in the low level causes the outputs of the first inverters 405, namely the gates of the second MOS transistors 402 to be in the high level, and the second MOS transistors 402 are turned on. By turning on the second MOS transistors 402, the fourth voltage V4 of 0.3 V obtained by dividing the input voltage VIN of 3 V at the voltage dividing ratio 0.1 of the third resistor R3 is input to the non-inverted input terminals of the first comparators 404. Since the outputs of the second inverters 406 are in the low level at this time, the first MOS transistors 401 are in the off state.

The first comparator 404 of the first input voltage detection circuit 42 compares the input fourth voltage V4 of 0.3 V with the fifth voltage V5 of 0.4 V. Since the fourth voltage V4 is less than the fifth voltage V5, the output of the first comparator 404 is brought into the low level. In doing so, the second MOS transistor 402 is turned on, the first MOS transistor 401 is turned off, and the first detection signal SIG_1 is brought into the low level L.

The first comparator 404 of the second input voltage detection circuit 43 compares the input fourth voltage V4 of 0.3 V with the fifth voltage V5 of 1.0 V. Since the fourth voltage V4 is less than the fifth voltage V5, the output of the first comparator 404 is brought into the low level. In doing so, the second MOS transistor 402 is turned on, the first MOS transistor 401 is turned off, and the second detection signal SIG_2 is brought into the low level L.

Therefore, when the input voltage VIN is 3 V, that is less than 4 V, as illustrated in FIG. 8, both the first detection signal SIG_1 and the second detection signal SIG_2 are brought into the low level L.

The first detection signal SIG_1 and the second detection signal SIG_2 at the low level L are input to the first NAND gate 511, the NOR gate 512, and the second NAND gate 513 of the logic circuit 51.

With SIG_1 and SIG_2 at the low level L being input thereto, the first NAND gate 511 outputs a high-level signal to the first AND gate 515. The NOR gate 512 outputs a high-level signal to the first AND gate 515 and the first inverter 514. With the high-level signal input thereto, the first inverter 514 outputs a low-level signal to the second AND gate 516. The second NAND gate 513 outputs a high-level signal to the second AND gate 516 and the second inverter 517.

With the high-level signal being input from the first NAND gate 511 and the NOR gate 512, the first AND gate 515 outputs SIG_A in the high level H to the first MOS transistor 521 of the first output circuit 52.

With the low-level signal being input from the first inverter 514 and the high-level signal input from the second NAND gate 513, the second AND gate 516 outputs SIG_B at the low level L to the second MOS transistor 531 of the second output circuit 53.

With the high-level signal being input from the second NAND gate 513, the second inverter 517 outputs SIG_C at the low level L to the third MOS transistor 541 of the third output circuit 54.

Therefore, when the input voltage VIN is 3 V, that is less than 4 V, as illustrated in FIG. 8, SIG_A is brought into the high level H, SIG_B is brought into the low level L, and SIG_C is brought into the low level L.

With the SIG_A in the high level, the first output circuit 52 outputs the third voltage V3 of 0.2 V (that is 0.05 times the selected first voltage V1 of 4 V) to the inverted input terminal of the second comparator 62.

Since the sixth voltage V6 (as the non-inverted input of the second comparator 62) is 0 V at this time, the second comparator 62 outputs the low-level voltage boosting control signal CNT (instructing the boosting of the voltage to the oscillation circuit 64). In doing so, the oscillation circuit 64 outputs a clock pulse to the charge pump circuit 65. By the clock pulse input thereto, the charge pump circuit 65 starts outputting of the gate voltage V2 obtained by boosting the input voltage VIN.

When the output of the gate voltage V2 is started, the sixth voltage V6, as a difference between the seventh voltage V7 that is 0.05 times the gate voltage V2 and the eighth voltage V8 that is 0.05 times the input voltage VIN of 3 V, becomes greater than 0 V. However, the value of the sixth voltage V6 is less than the third voltage V3 of 0.2 V at an initial stage of the start of the voltage boosting. Therefore, the second comparator 62 continuously outputs the low-level voltage boosting control signal CNT, and the voltage boosting circuit 63 continuously boosts the input voltage VIN during an initial stage at the start of the voltage boosting.

At the time when the boosting of the input voltage VIN advances and the gate voltage V2 becomes greater than 4 V (that is the next first voltage V1 is selected with respect to the input voltage VIN), the sixth voltage V6 becomes greater than the third voltage V3. When the sixth voltage V6 is greater than the third voltage V3, the second comparator 62 outputs the high-level voltage boosting control signal CNT (an instruction for stopping the voltage boosting) to the oscillation circuit 64. In doing so, the oscillation circuit 64 stops the output of the clock pulse to the charge pump circuit 65. When the input of the clock pulse is stopped, the charge pump circuit 65 stops boosting of the input voltage VIN.

When the input voltage VIN is 3V (less than 4 V), a gate voltage V2 of 7 V (greater than the input voltage VIN by 4 V) can be obtained as described above.

(If Input Voltage VIN is 5 V)

If the input voltage VIN is 5 V, the fourth voltage V4 of 0.5 V (obtained by dividing the input voltage VIN of 5 V at the voltage dividing ratio 0.1 of the third resistor R3) is input to the non-inverted input terminal of the first comparator 404.

The first comparator 404 of the first input voltage detection circuit 42 compares the input fourth voltage V4 (0.5 V) with the fifth voltage V5 (0.4 V). Since the fourth voltage V4 is greater than the fifth voltage V5, the output of the first comparator 404 is brought into the high level. The output of the first inverter 405 is brought into the low level, and the output of the second inverter 406 is brought into the high level. In doing so, the second MOS transistor 402 is turned off, the first MOS transistor 401 is turned on, and the first detection signal SIG_1 is brought into the high level H.

The first comparator 404 of the second input voltage detection circuit 43 compares the input fourth voltage V4 (0.5 V) with the fifth voltage V5 (1.0 V). Since the fourth voltage V4 is less than the fifth voltage V5, the output of the first comparator 404 is brought into the low level. The output of the first inverter 405 is brought into the high level, and the output of the second inverter 406 is brought into the low level. In doing so, the second MOS transistor 402 is turned on, the first MOS transistor 401 is turned off, and the second detection signal SIG_2 is brought into the low level L.

Therefore, when the input voltage VIN is 5 V (that is, equal to or greater than 4V and less than 10 V as illustrated in FIG. 8), the first detection signal SIG_1 is brought into the high level H, and the second detection signal SIG_2 is brought into the low level L.

The first detection signal SIG_1 in the high level H and the second detection signal SIG_2 in the low level are input to the first NAND gate 511, the NOR gate 512, and the second NAND gate 513 of the logic circuit 51.

With SIG_1 at the high level H and SIG_2 at the low level input thereto, the first NAND gate 511 outputs a high-level signal to the first AND gate 515. The NOR gate 512 outputs a low-level signal to the first AND gate 515 and the first inverter 514. With the low level signal input thereto, the first inverter 514 outputs a high-level signal to the second AND gate 516. The second NAND gate 513 outputs a high-level signal to the second AND gate 516 and the second inverter 517.

With the high-level signal input from the first NAND gate 511 and the low-level signal input from the NOR gate 512, the first AND gate 515 outputs SIG_A at the low level L to the first MOS transistor 521 of the first output circuit 52.

With the high-level signal input from the first inverter 514 and the high-level signal input from the second NAND gate 513, the second AND gate 516 outputs SIG_B at the high level H to the second MOS transistor 531 of the second output circuit 53.

With the high-level signal input from the second NAND gate 513, the second inverter 517 outputs SIG C at the low level L to the third MOS transistor 541 of the third output circuit 54.

Therefore, when the input voltage VIN is 5 V (that is, equal to or greater than 4V and less than 10 V as illustrated in FIG. 8), SIG_A is brought into the low level L, SIG_B is brought into the high level H, and SIG_C is brought into the low level L.

With SIG_B being in the high level, the second output circuit 53 outputs the third voltage V3 of 0.325 V (that is, 0.05 times as high as the selected first voltage V1 of 6.5 V) to the inverted input terminal of the second comparator 62.

In such a case, the value of the sixth voltage V6 is a smaller value than the value 0.325 V of the third voltage V3 until the gate voltage V2 becomes greater than the input voltage VIN by the selected first voltage V1 of 6.5 V. Therefore, the input voltage VIN is continuously boosted until the gate voltage V2 becomes greater than the input voltage VIN by 6.5 V.

At the time when the boosting of the input voltage VIN advances and the gate voltage V2 becomes greater than the input voltage VIN by 6.5 V, the sixth voltage V6 becomes greater than the third voltage V3, and the boosting of the input voltage VIN is stopped.

The gate voltage V2 of 11.5 V (that is, greater than the input voltage VIN by 6.5 V) can be obtained when the input voltage VIN is 5 V (that is, equal to or greater than 4 V and less than 10 V) as described above.

Since the fourth voltage V4 has the value of Equation (2) when the input voltage VIN decreases from 5 V to 4 V, the fourth voltage V4 is in the level of greater than the fifth voltage V5 even if the input voltage VIN become 4 V. Therefore, the first voltage V1 of 6.5 V is still selected even when the input voltage VIN initially decreases to 4 V. When the input voltage VIN decreases to 3.64 V, the fourth voltage V4 then becomes less than the fifth voltage V5, and the first voltage V1 of 4 V is selected. That is, the input voltage VIN required for inverting the output of the first comparator 404 decreases from 4 V at the time of the increase in voltage to 3.64 V due to hysteresis at the time of the decrease of the input voltage VIN.

(If Input Voltage VIN is 12 V)

When the input voltage VIN is 12 V, the fourth voltage V4 of 1.2 V (obtained by dividing the input voltage VIN of 12 V at the voltage dividing ratio 0.1 of the third resistor R3) is input to the non-inverted input terminal of the first comparator 404.

The first comparator 404 of the first input voltage detection circuit 42 compares the input fourth voltage V4 of 1.2 V with the fifth voltage V5 of 0.4 V. Since the fourth voltage V4 is greater than the fifth voltage V5, the output of the first comparator 404 is brought into the high level. The output of the first inverter 405 is brought into the low level, and the output of the second inverter 406 is brought into the high level. In doing so, the second MOS transistor 402 is turned off, the first MOS transistor 401 is turned on, and the first detection signal SIG_1 is brought into the high level H.

The first comparator 404 of the second input voltage detection circuit 43 compares the input fourth voltage V4 of 1.2 V with the fifth voltage V5 of 1.0 V. Since the fourth voltage V4 is greater than the fifth voltage V5, the output of the first comparator 404 is brought into the high level. The output of the first inverter 405 is brought into the low level, and the output of the second inverter 406 is brought into the high level. In doing so, the second MOS transistor 402 is turned off, the first MOS transistor 401 is turned on, and the second detection signal SIG_2 is brought into the high level H.

Therefore, when the input voltage VIN is 12 V (that is, equal to or greater than 10 V as illustrated in FIG. 8), both the first detection signal SIG_1 and the second detection signal SIG_2 are brought into the high level H.

The first detection signal SIG_1 and the second detection signal SIG_2 in the high level H are input to the first NAND gate 511, the NOR gate 512, and the second NAND gate 513 of the logic circuit 51.

With SIG_1 and SIG_2 in the high level H input thereto, the first NAND gate 511 outputs a low-level signal to the first AND gate 515. The NOR gate 512 outputs a low-level signal to the first AND gate 515 and the first inverter 514. With the low-level signal input thereto, the first inverter 514 outputs a high-level signal to the second AND gate 516. The second NAND gate 513 outputs a low-level signal to the second AND gate 516 and the second inverter 517.

With the low-level signal input from the first NAND gate 511 and the low-level signal input from the NOR gate 512, the first AND gate 515 outputs SIG_A in the low level L to the first MOS transistor 521 of the first output circuit 52.

With the high-level signal input from the first inverter 514 and the low-level signal input from the second NAND gate 513, the second AND gate 516 outputs SIG_B in the low level L to the second MOS transistor 531 of the second output circuit 53.

With the low-level signal input from the second NAND gate 513, the second inverter 517 outputs SIG_C in the high level H to the third MOS transistor 541 of the third output circuit 54.

Therefore, when the input voltage VIN is 12 V (that is, equal to or greater than 10 V as illustrated in FIG. 8), SIG_A is brought into the low level L, SIG_B is brought into the low level L, and SIG_C is brought into the high level H.

With SIG_C being at the high level, the third output circuit 54 outputs the third voltage V3 of 0.425 V that is 0.05 times as high as the selected first voltage V1 of 8.5 V to the inverted input terminal of the second comparator 62.

In this case, the value of the sixth voltage V6 becomes a value that is smaller than the value 0.425 V of the third voltage V3 until the gate voltage V2 becomes greater than the input voltage VIN by the selected first voltage V1 of 8.5 V. Therefore, the input voltage VIN is continuously boosted until the gate voltage V2 becomes greater than the input voltage VIN by 8.5 V.

At the time when the boosting of the input voltage VIN advances and the gate voltage V2 becomes greater than the input voltage VIN by 8.5 V, the sixth voltage V6 becomes greater than the third voltage V3, and the boosting of the input voltage VIN is stopped.

The gate voltage V2 of 20.5 V (greater than the input voltage VIN by 8.5 V) can be obtained when the input voltage VIN is 12 V as described above.

If the boosting operation of the voltage boosting circuit 63 were controlled based on an output voltage VOUT of the external MOS transistors M1 and M2, it would be necessary to provide a detection terminal for the output voltage VOUT on the chip. When the detection terminal for the output voltage VOUT is provided on or in the chip, the area of the chip increases.

There are at least two types of products, namely a product with a configuration (WCSP—wafer level chip scale packaging) in which solder balls are directly mounted on a chip and a product with a configuration (QFN—quad flat no-leads packaging) in which a chip is placed on a lead frame, wires are connected, and the entire package is sealed with resin. If the detection terminal for the output voltage VOUT is to be provided, the number of solder ball connections increases from six to nine, and the device area thus increases to about 1.5 times the device area without the additional detection terminal for a WCSP device. Similarly, the number of PINs will have to be increased from six to eight if the detection terminal for the output voltage must be provided in a QFN device, and the device area thus increases to about 1.33 times the device area required for a device without the additional detection terminal with QFN devices.

The external MOS transistor M1 and M2 a product with a QFN configuration as mentioned above.

Here, according to an embodiment, the appropriate first voltage V1 can be selected based on detecting the input voltage VIN rather than an output voltage VOUT, and the input voltage VIN can be boosted with the appropriate first voltage V1 as necessary. In doing so, the sizes of the chip including the voltage control circuit and the total product incorporating the voltage control circuit can be reduced, and the voltage can still be efficiently boosted.

Also, a voltage that changes in a stepwise manner according to predetermined voltage ranges VRNG1 to 3 is used as the first voltage V1 instead of a voltage with a value that just linearly varies according to the input voltage VIN. By using a first voltage V1 that changes in the stepwise manner over a range of input voltages VIN, it is possible to simplify a circuit configuration and control as compared with the case of using the first voltage V1 that linearly changes over the full range of possible input voltages.

Therefore, according to the embodiment, it is possible to reduce the total size of the chip and the products including the chip.

(Modification Examples)

Figure 9:
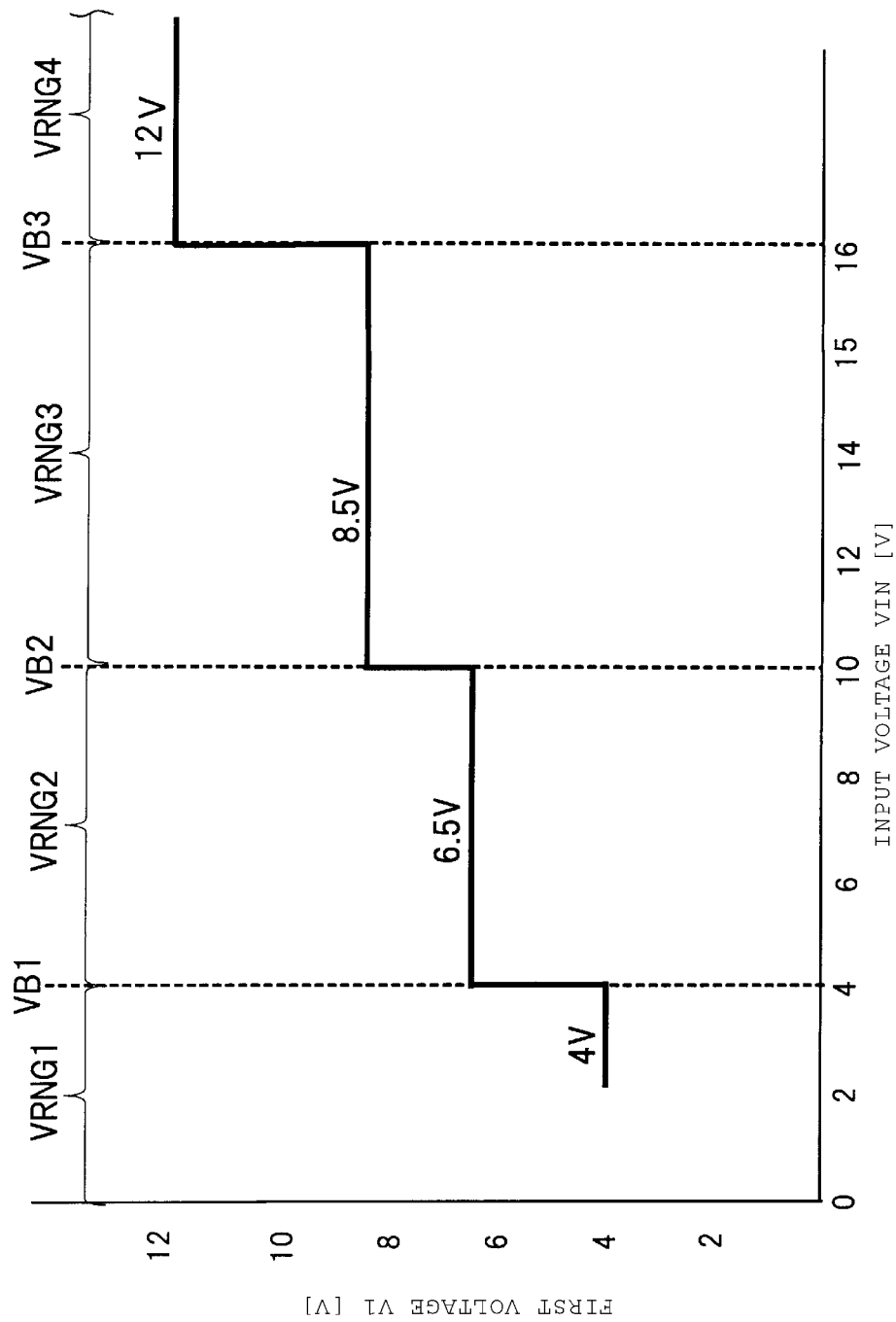
FIG. 9 is a diagram illustrating a first voltage of an output voltage control circuit according to a modification example of the embodiment.

Next, modification examples with increased options for the first voltage V1 will be described as modification examples of the embodiment. In this modification example (and those that follow), descriptions corresponding to the configurations already illustrated in FIGS. 1 to 8 will not be repeated. FIG. 9 is a diagram illustrating a first voltage of the output voltage control circuit 1 according to a modification example of the embodiment.

In the previous description, three different first voltages V1 were used to boost the input voltage VIN. In contrast, four first voltages V1 (corresponding to four voltage ranges VRNG1 to VRNG4, respectively) are used to boost the input voltage VIN in this modification example. In one example, four first voltages V1 of 4 V, 6.5 V, 8.5 V, and 12 V can be used as illustrated in FIG. 9. Since four first voltages are used, three boundary voltages VB1 to VB3 are at the boundaries of the four voltage ranges VRNG1 to VRNG4 and these boundary voltages VB1 to VB3 are used to detect the input voltage VIN in the modification example. In one example, the three boundary voltages VB1, VB2, and VB3 are 4 V, 10 V, and 16 V as illustrated in FIG. 9.

Figure 10:
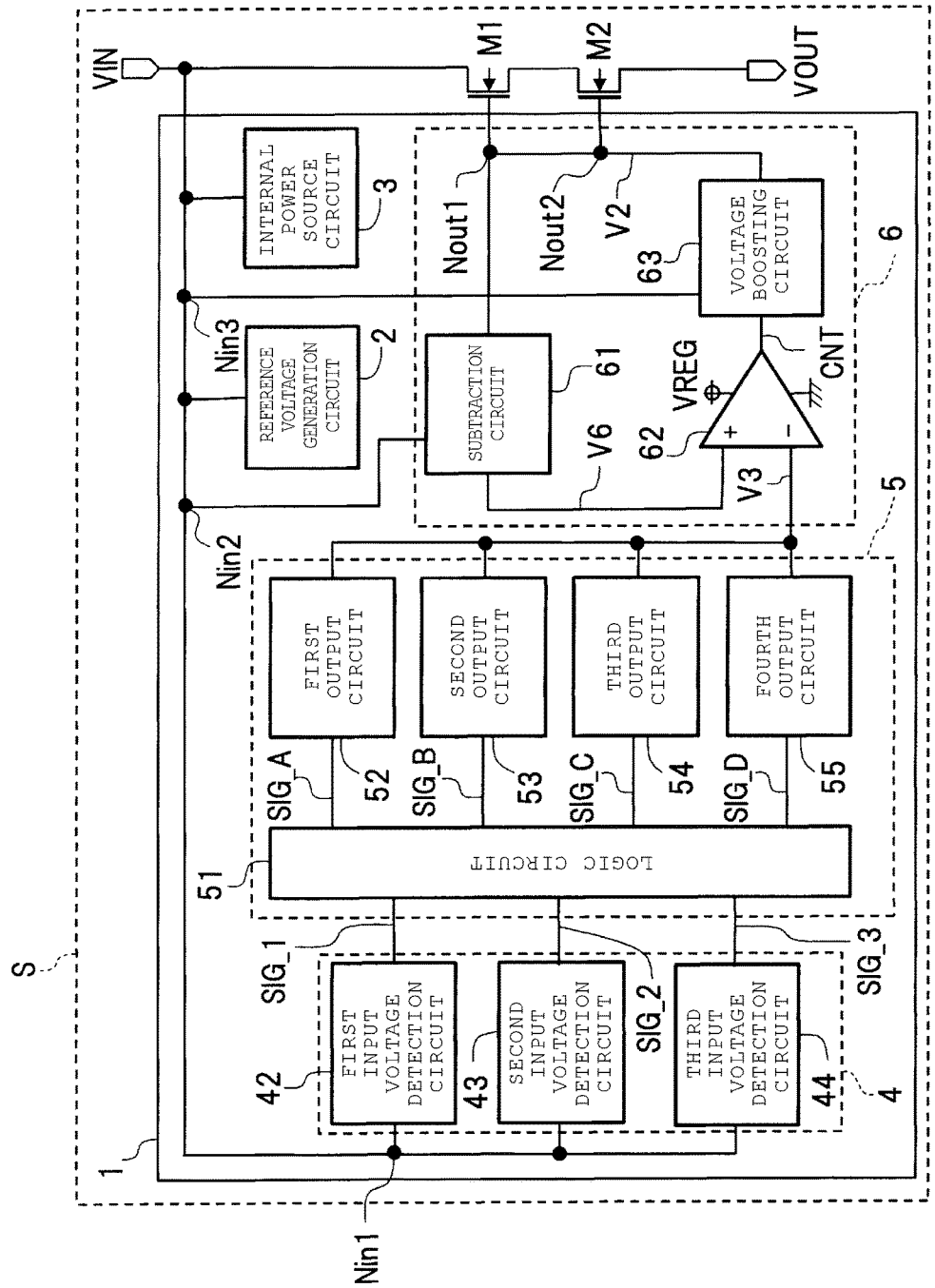
FIG. 10 is a block diagram of the output voltage control circuit according to the modification example of the embodiment.

FIG. 10 is a block diagram of the output voltage control circuit 1 according to this modification example. As illustrated in FIG. 10, in order to select the four first voltages V1, the output voltage control circuit 1 further includes a third input voltage detection circuit 44 and a fourth output circuit 55 added to the configuration depicted in FIG. 1. The logic circuit 51 according to the modification example also has a configuration different from that illustrated in FIG. 3.

The third input voltage detection circuit 44 is a circuit that compares the input voltage VIN to the third boundary voltage VB3 and outputs a result of the comparison. A configuration of the third input voltage detection circuit 44 is generally the same as those of the other input voltage detection circuits 42 and 43 excepting that the fifth voltage V5 to be input to the inverted input terminal of the first comparator 404 is different.

The fifth voltage V5 is a voltage obtained by dividing the reference voltage VBGR and has the same value as the fourth voltage V4 when the input voltage VIN is at the third boundary voltage VB3.

The third input voltage detection circuit 44 outputs a third detection signal SIG_3 in accordance with a comparison between the fourth voltage V4 and the fifth voltage V5. For example, if the input voltage VIN is equal to or greater than 16 V, the third detection signal SIG_3 and the other detection signals SIG_1 and SIG_2 are brought into the high level H.

Figure 11:
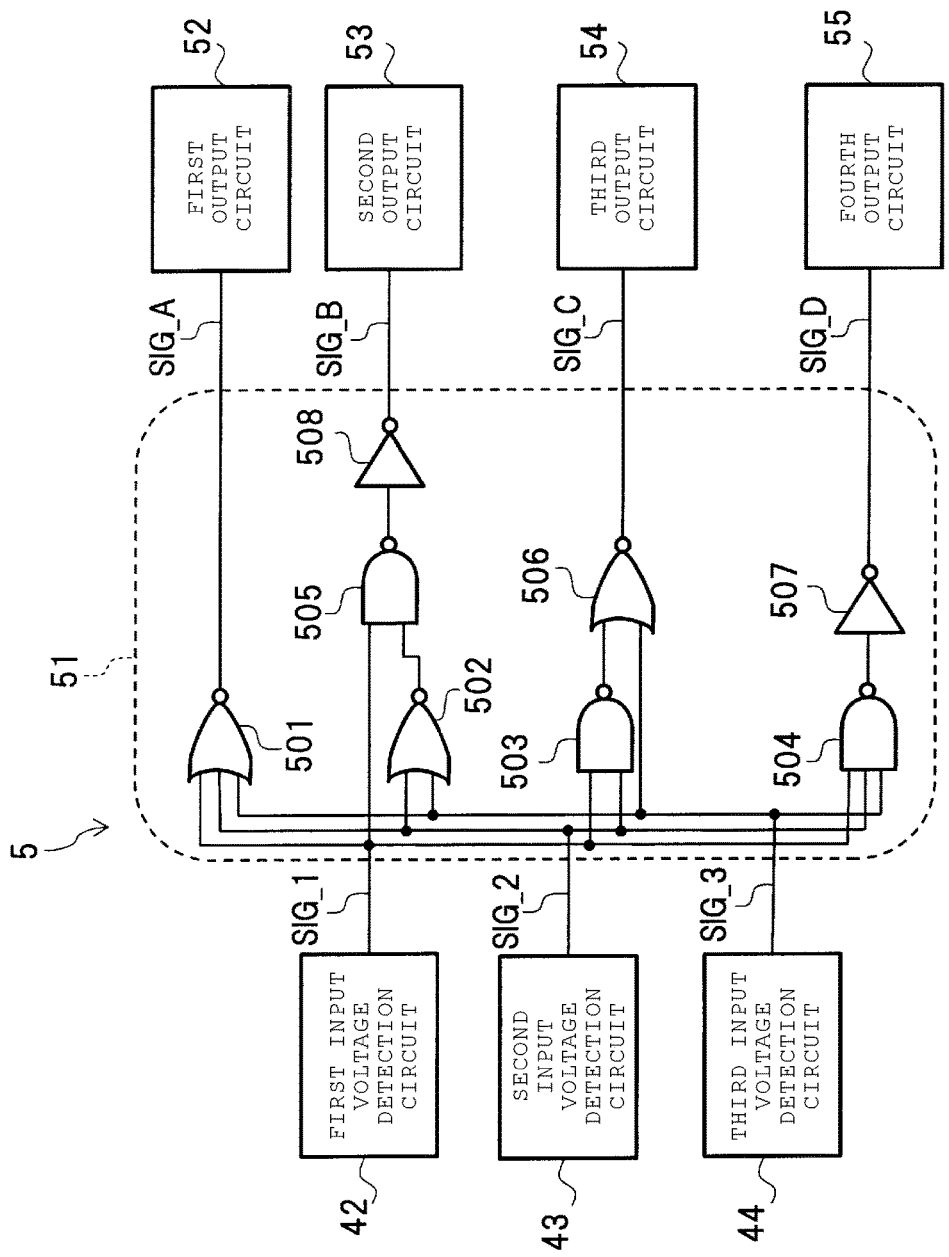
FIG. 11 is a circuit diagram illustrating a logic circuit of the output voltage control circuit according to the modification example of the embodiment.

FIG. 11 is a circuit diagram illustrating the logic circuit 51 according to this modification example. As illustrated in FIG. 11, the logic circuit 51 according to the modification example includes a first NOR gate 501, a second NOR gate 502, a first NAND gate 503, a second NAND gate 504, a third NAND gate 505, a third NOR gate 506, a first inverter 507, and a second inverter 508.

The first NOR gate 501 has three input terminals connected to the first to third input voltage detection circuits 42 to 44 and an output terminal connected to the first output circuit 52. The first NOR gate 501 outputs a signal SIG_A indicating NOR of the first to third detection signals SIG_1 to SIG_3 to the first output circuit 52.

The second NOR gate 502 has two input terminals connected to the second and third input voltage detection circuits 43 and 44 and an output terminal connected to the second input terminal of the third NAND gate 505. The second NOR gate 502 outputs a signal indicating NOR between the second detection signal SIG_2 and the third detection signal SIG_3 to the third NAND gate 505.

The first NAND gate 503 has two input terminals connected to the first and second input voltage detection circuits 42 and 43 and an output terminal connected to the first input terminal of the third NOR gate 506. The first NAND gate 503 outputs a signal indicating NAND between the first detection signal SIG_1 and the second detection signal SIG_2 to the third NOR gate 506.

The second NAND gate 504 has three input terminals connected to the first to third input voltage detection circuits 42 to 44 and an output terminal connected to the input terminal of the first inverter 507. The second NAND gate 504 outputs a signal indicating NAND of the first to third detection signals SIG_1 to SIG_3 to the first inverter 507.

The third NAND gate 505 has a first input terminal connected to the first input voltage detection circuit 42 and an output terminal connected to the input terminal of the second inverter 508. The third NAND gate 505 outputs a signal indicating NAND between the output signal of the second NOR gate 502 and the first detection signal SIG_1 to the second inverter 508.

The third NOR gate 506 has a second input terminal is connected to the third input voltage detection circuit 44 and an output terminal connected to the third output circuit 54. The third NOR gate 506 outputs a signal indicating NOR between the output signal of the first NAND gate 503 and the third detection signal SIG_C to the third output circuit 54.

The output terminal of the first inverter 507 is connected to the fourth output circuit 55. The first inverter 507 outputs an inverted signal SIG_D of the output signal of the second NAND gate 504 to the fourth output circuit 55.

The output terminal of the second inverter 508 is connected to the second output circuit 53. The second inverter 508 outputs an inverted signal SIG_B of the output signal of the third NAND gate 505 to the second output circuit 53.

FIG. 12 is a diagram illustrating a truth value table for the output voltage control circuit 1 according to the modification example. The logic circuit 51 in FIG. 11 operates in accordance with the truth value table in FIG. 12. As illustrated in FIG. 12, if all the detection signals SIG_1 to SIG_3 are brought into the high level H, the logic circuit 51 outputs SIG_A to SIG_C at the low level L to the first to third output circuits 52 to 54 and outputs SIG_D at the high level H to the fourth output circuit 55.

The fourth output circuit 55 is a circuit that selects the first voltage V1 corresponding to the fourth voltage range VRNG4 and outputs the third voltage V3 corresponding to the selected first voltage V1 to the output unit 6. With SIG_D in the high level H being input thereto, the fourth output circuit 55 outputs the third voltage V3 to the inverted input terminal of the second comparator 62. The configuration of the fourth output circuit 55 is substantially the same as those of the other output circuits 52 to 54, excepting that the third voltage V3 is different. For example, the third voltage V3 output by the fourth output circuit 55 may be 0.6 V—that is, 0.05 times as high as the first voltage V1 of 12 V selected by the fourth output circuit 55.

In the modification example (s), it is possible to control the gate voltage V2 based on the input voltage VIN without requiring the detection terminal of the output voltage VOUT of the external MOS transistors M1 and M2 in the same manner as in the configuration in FIG. 1 and to thereby reduce the sizes of the chip and the product. As demonstrated in the modification example, it is possible to increase the number of first voltages V1 that can be selected according to the input voltage VIN and to thereby more precisely control the gate voltage V2.

In addition, it is also possible to similarly modify the output voltage control circuit 1 to select from among five or more first voltages V1. Also, it is possible to apply the output voltage control circuit 1 to control an output voltage other than a gate voltage supplied to external MOS transistors M1 and M2.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An output voltage control circuit, comprising:
    a detection circuit connected to an input voltage terminal and configured to detect a voltage level of an input voltage received at the input voltage terminal and output one or more detection signals corresponding to a comparison of the voltage level of the input voltage to a plurality of predetermined voltage ranges;
    a selection circuit connected to the detection circuit and configured to select a first voltage from among a plurality of first voltages according the one or more detection signals from the detection circuit; and
    an output circuit connected to the selection circuit and configured to output a second voltage by boosting the input voltage based on the first voltage selected by the selection unit.

2. The output voltage control circuit according to claim 1, wherein the first voltage that is selected by the selection circuit varies in a stepwise manner according to a plurality of predetermined ranges established for the voltage level of the input voltage.

3. The output voltage control circuit according to claim 1, wherein the selection circuit includes:
    a plurality of output circuits each configured to provide, to the output unit, a third voltage that corresponds to one of the plurality of first voltages; and
    a logic circuit configured to provide a control signal for selecting one of the plurality of output circuits according to the one or more detection signals.

4. The output voltage control circuit according to claim 3, wherein the detection circuit includes a plurality of first comparators each of which compares a fourth voltage and a fifth voltage and outputs a comparison result to the logic circuit, the fourth voltage corresponding to the input voltage, the fifth voltage corresponding to a boundary voltage for a one of the plurality of predetermined ranges.

5. The output voltage control circuit according to claim 4, further comprising:
    a generation unit configured to generate a reference voltage, wherein
    the fourth voltage is obtained by voltage dividing the input voltage, and
    the fifth voltage is obtained by voltage dividing the reference voltage and is equal to the fourth voltage when the input voltage is the voltage at the boundary voltage for the one of the plurality of predetermined ranges.

6. The output voltage control circuit according to claim 5, wherein the fourth voltage and the fifth voltage are each less than a power source voltage supplied to the plurality of first comparators.

7. The output voltage control circuit according to claim 3, wherein the output circuit includes:
    a voltage boosting circuit configured to boost the input voltage;
    a subtraction circuit configured to generate a sixth voltage based on a difference between the second voltage and the input voltage; and
    a second comparator configured to compare the third voltage to the sixth voltage and output a signal to the voltage boosting circuit instructing the voltage boosting circuit to boost or stop boosting the input voltage according to the comparison of the third voltage to the sixth voltage.

8. The output voltage control circuit according to claim 7, further comprising:
    a generation unit configured to generate a reference voltage, wherein
    the third voltage is obtained by voltage dividing the reference voltage and has a value that is proportional to the first voltage selected by the selection circuit by a first factor that is greater than zero and less than one, and
    the sixth voltage is obtained by subtracting an eighth voltage from a seventh voltage, the eight voltage obtained by voltage dividing the input voltage to have a voltage level corresponding to the input voltage multiplied by the first factor, and the seventh voltage obtained by voltage dividing the second voltage to have a voltage level equal to the second voltage multiplied by the first factor.

9. The output voltage control circuit according to claim 8, wherein the third voltage and the sixth voltage are each less than a power source voltage supplied to the second comparator.

10. An output voltage control circuit, comprising:
    a first input voltage detection circuit that generates an output signal indicating whether an input voltage is greater than a first boundary voltage;
    a second input voltage detection circuit that generates an output signal indicating whether the input voltage is greater than a second boundary voltage higher than the first boundary voltage;
    a logic circuit that outputs a first logic signal when the input voltage is less than the first boundary voltage and a second logic signal when the input voltage is greater than the first boundary voltage and less than the second boundary voltage;
    a selection circuit that includes:
    a first output circuit that outputs a first value of a first voltage when the first logic signal is supplied;
    a second output circuit outputs a second value of the first voltage when the second logic signal is supplied, the selection circuit outputting a third voltage that is one of first value or the second value of the first voltage; and a boosting circuit that boosts third voltage output from the selection circuit to provide a second voltage that is greater than the input voltage by an amount equal to the third voltage.

11. The output voltage control circuit according to claim 10, wherein the boosting circuit includes:
a subtractor that provides a sixth voltage that is a difference between the second voltage and the input voltage;
a boost comparator that generates a boosting control signal when the sixth voltage is less than the third voltage; and
a voltage boosting circuit that receives the boosting control signal and generates the second voltage.

12. The output voltage control circuit according to claim 11, wherein the third voltage and the sixth voltage are less than a power source voltage supplied to the boost comparator.

13. The output voltage control circuit according to claim 11, wherein the voltage boosting circuit includes:
an oscillation circuit that receives the boosting control signal and generates an oscillating signal that oscillates at a particular frequency in response to the boosting control signal; and
a charge pump circuit that receives the oscillating signal and generates the second voltage by boosting the input voltage.

14. The output voltage control circuit according to claim 13, wherein the particular frequency is adjustable.

15. The output voltage control circuit according to claim 13, wherein the oscillation circuit is a ring oscillator.

16. The output voltage control circuit according to claim 10, wherein the first and second voltage detection circuits each includes:

a comparator that outputs a comparison of a fourth voltage to a fifth voltage;
a first resistor divider that generates the fourth voltage based on the input voltage; and
a second resistor divider that generates the fifth voltage based on a boundary voltage.

17. The output voltage control circuit according to claim 16, wherein the fourth voltage and the fifth voltage are less than a power source voltage of the comparator.

18. The output voltage control circuit according to claim 16, wherein the fourth voltage is selectable based on the output of the comparator, the fourth voltage being a larger fraction of the input voltage when the comparator output is a high-level and a smaller fraction of the input voltage when the comparator output is a low-level.

19. The output voltage control circuit according to claim 18, wherein
the first resistor divider includes a first resistor and second resistor connected at a first node and the second resistor and a third resistor connected at a second node, and
the output voltage control circuit further comprises a first transistor generating the fourth voltage from the first node when the comparator output is a high-level and a second transistor generating the fourth voltage from the second node when the comparator output is a low level.

20. The output voltage control circuit according to claim 10, wherein the first and second output circuits each includes:
a voltage divider that provides the first voltage; and
a switch that is activated by a logic signal to enable the first voltage to be output as the third voltage.

* * * * *